US012747556B2

(12) United States Patent
Shokouhi

(10) Patent No.: US 12,747,556 B2
(45) Date of Patent: Sep. 29, 2026

(54) MANHOLE COVER ASSEMBLY

(71) Applicant: Neenah Foundry Company, Neenah, WI (US)

(72) Inventor: Hassan Shokouhi, Neenah, WI (US)

(73) Assignee: Neenah Foundry Company, Neenah, WI (US)

( * ) Notice: Subject to any disclaimer, the term of this patent is extended or adjusted under 35 U.S.C. 154(b) by 601 days.

(21) Appl. No.: 18/270,890

(22) PCT Filed: Jan. 5, 2022

(86) PCT No.: PCT/US2022/011279
§ 371 (c)(1),
(2) Date: Jul. 5, 2023

(87) PCT Pub. No.: WO2022/150358
PCT Pub. Date: Jul. 14, 2022

(65) Prior Publication Data

US 2024/0301646 A1 Sep. 12, 2024

Related U.S. Application Data

(60) Provisional application No. 63/134,279, filed on Jan. 6, 2021.

(51) Int. Cl.
*E02D 29/14* (2006.01)
*E05B 55/00* (2006.01)
*E05B 65/00* (2006.01)

(52) U.S. Cl.
CPC .......... *E02D 29/1427* (2013.01); *E05B 55/00* (2013.01); *E05B 65/006* (2013.01)

(58) Field of Classification Search
CPC . E02D 29/1427; E02D 29/14; E02D 29/1481; E05B 55/00; E05B 67/36
See application file for complete search history.

(56) References Cited

U.S. PATENT DOCUMENTS 1,001,041 A * 8/1911 Jones .................. E02D 29/1427 49/33
1,475,199 A 11/1923 Rust
(Continued)

FOREIGN PATENT DOCUMENTS

DE 29812720 10/1998
EP 1 808 535 A2 7/2007
(Continued)

OTHER PUBLICATIONS

International Search Report and Written Opinion for PCT Application No. PCT/US2022/011279, dated Mar. 25, 2022.

*Primary Examiner* — Abigail A Risic
(74) *Attorney, Agent, or Firm* — Foley & Lardner LLP

(57) ABSTRACT

A manhole cover assembly includes a manhole cover supportable by a seat of a manhole frame and a latch assembly. The latch assembly includes a latch housing, a latch bar, and a padlock. The latch housing is fixedly coupled to the manhole cover and defines a channel that extends through the latch housing. The latch bar is coupled to the channel and is slidable relative to the latch housing between a locked position and an unlocked position. The padlock is operatively coupled to the latch bar and is configured to maintain the latch bar in the locked position.

19 Claims, 3 Drawing Sheets

(56) References Cited

U.S. PATENT DOCUMENTS

| | | | | |
|---|---|---|---|---|
| 4,257,193 | A * | 3/1981 | Williams | E05B 65/006 70/144 |
| 6,435,763 | B1 | 8/2002 | Sakane et al. | |
| 6,739,796 | B1 | 5/2004 | Del Nero et al. | |
| 6,881,007 | B2 | 4/2005 | Dennis | |
| 7,883,290 | B1 | 2/2011 | Ross | |
| 8,220,298 | B2 * | 7/2012 | Burke | E05B 65/006 292/202 |
| 9,834,903 | B2 | 12/2017 | Armstrong et al. | |
| 2008/0168808 | A1 * | 7/2008 | Neuber | E02D 29/1427 70/167 |
| 2009/0255183 | A1 | 10/2009 | Nolle et al. | |
| 2010/0028077 | A1 * | 2/2010 | Stadler | E02D 29/1436 404/25 |
| 2013/0221688 | A1 | 8/2013 | Stadler | |
| 2017/0081821 | A1 * | 3/2017 | Shokouhi | E02D 29/1427 |
| 2018/0142438 | A1 | 5/2018 | Shokouhi | |
| 2021/0332617 | A1 * | 10/2021 | Burke | H05K 7/186 |

FOREIGN PATENT DOCUMENTS

| | | |
|---|---|---|
| EP | 3 169 851 | 5/2017 |
| FR | 2724687 | 3/1996 |
| FR | 2804152 | 7/2001 |
| NO | 321767 | 3/2006 |
| WO | WO-2014/202099 | 12/2014 |

* cited by examiner

MANHOLE COVER ASSEMBLY

CROSS-REFERENCE TO RELATED PATENT APPLICATIONS

This application is the U.S. national stage of PCT Application No. PCT/US2022/011279, filed Jan. 5, 2022, which claims the benefit of and priority to U.S. Provisional Patent Application No. 63/134,279, filed Jan. 6, 2021, the content of which is incorporated by reference in its entirety.

TECHNICAL FIELD

The present application relates to manhole cover assemblies for covering and providing access to underground passages and confined areas.

BACKGROUND

A manhole provides access to an underground passage or confined area. The underground passage or confined area may contain public utility equipment, such as sewer lines, storm drains, electrical and telecommunication cables, etc. A manhole or hatch cover is a removable plate that forms a lid over the opening of a manhole. Manhole covers are used to prevent individuals and objects from falling into the manhole, as well as to prevent unauthorized access into the manhole. The terms "manhole cover" as used herein to mean either a manhole cover, a hatch cover, and the like.

Various manhole covers are conventionally formed of cast iron, which makes them inexpensive, strong, and heavy, usually weighing more than 100 pounds. The weight helps to keep them in place when traffic passes over them, and makes it difficult for unauthorized individuals to remove them. In addition to being constructed of cast iron, manhole covers may also be constructed of concrete, glass-reinforced plastic or other composite materials, and other materials, or any combination thereof.

Despite their significant weight, manhole covers can be removed by unauthorized personnel. Unauthorized personnel may cause damage to the infrastructure below, steal valuable metals if in an electrical utility vault, and/or cause other significant harm to the general public. Significant harm may include damaging electrical utilities, tampering with the water supply or damaging telecommunications/internet infrastructure.

SUMMARY

At least one embodiment relates to a manhole cover assembly. The manhole cover assembly includes a manhole frame having a seat, a manhole cover supportable by the seat of the manhole frame, and a latch assembly. The latch assembly includes a latch housing, a latch bar, and a padlock. The latch housing is fixedly coupled to the manhole cover and defines a channel that extends through the latch housing. The latch bar is coupled to the channel and is slidable relative to the latch housing between a locked position and an unlocked position. The padlock is operatively coupled to the latch bar and is configured to maintain the latch bar in the locked position.

At least one embodiment relates to a manhole cover assembly. The manhole cover assembly includes a manhole cover supportable by a seat of a manhole frame. The manhole cover assembly further includes a housing, a channel extending through the housing, a shackle recess, and a latch bar. The housing includes sidewalls and a bottom wall. In some embodiments, the housing extends away from a manhole cover. The channel extends into the bottom wall of the housing and extends through the sidewall such that a first opening and a second opening are defined, the first opening and the second opening extending through the sidewall. The shackle recess extends into the channel and the bottom wall, the shackle recess extending through the channel. The latch bar is positioned within the channel and extends through both the first opening and the second opening. The latch bar includes a latch rod extending through the first opening, a latch member extending through the second opening, a lock boss extending from the latch rod and separated from the latch member such that a lock cavity is defined cooperatively by the lock boss, the latch rod, and the latch member.

At least one embodiment relates to a latch assembly for a manhole cover. In some embodiments, the latch assembly is coupled to a manhole cover and configured to selectively lock or couple the manhole cover to a manhole frame. The latch assembly includes a housing, a first channel recessed into the housing, and a latch bar slidable relative to the housing. The housing incudes sidewalls and a bottom wall cooperatively defining a housing cavity. The first channel is recessed into the bottom wall and extends through the sidewalls such that a first opening and a second opening are defined through the sidewalls. The latch bar is slidable within and along the first channel between a locked position and an unlocked position such that the latch bar is slidable through both the first opening and the second opening.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGS. 1-5, a manhole cover assembly 100 is provided that is locked with a padlock. The padlock may be an off-the-shelf padlock marketed by various companies.

Figure 1:
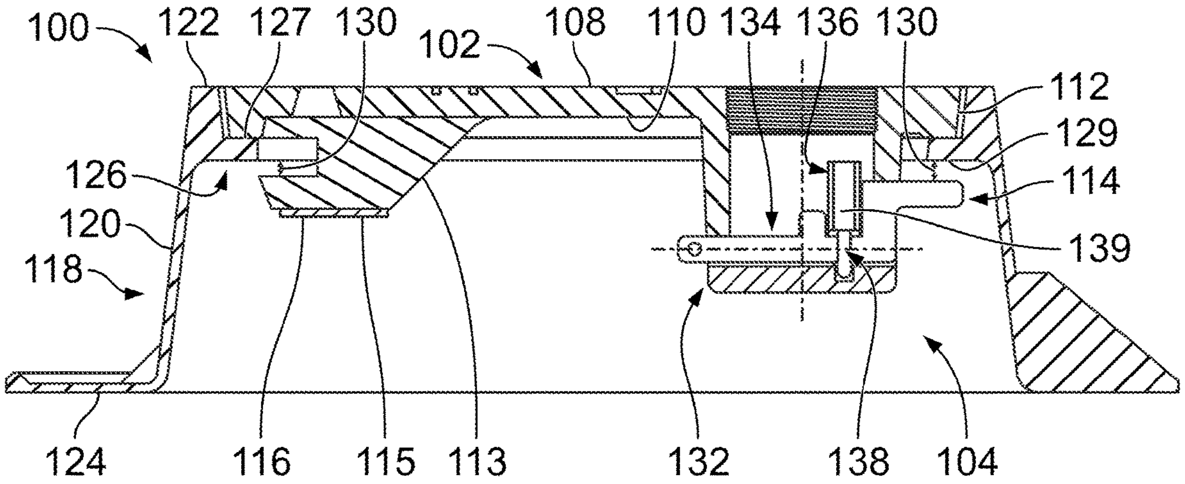
FIG. 1 is a cross-sectional view of a manhole cover assembly having a latch assembly, according to an example embodiment.
Figure 2:
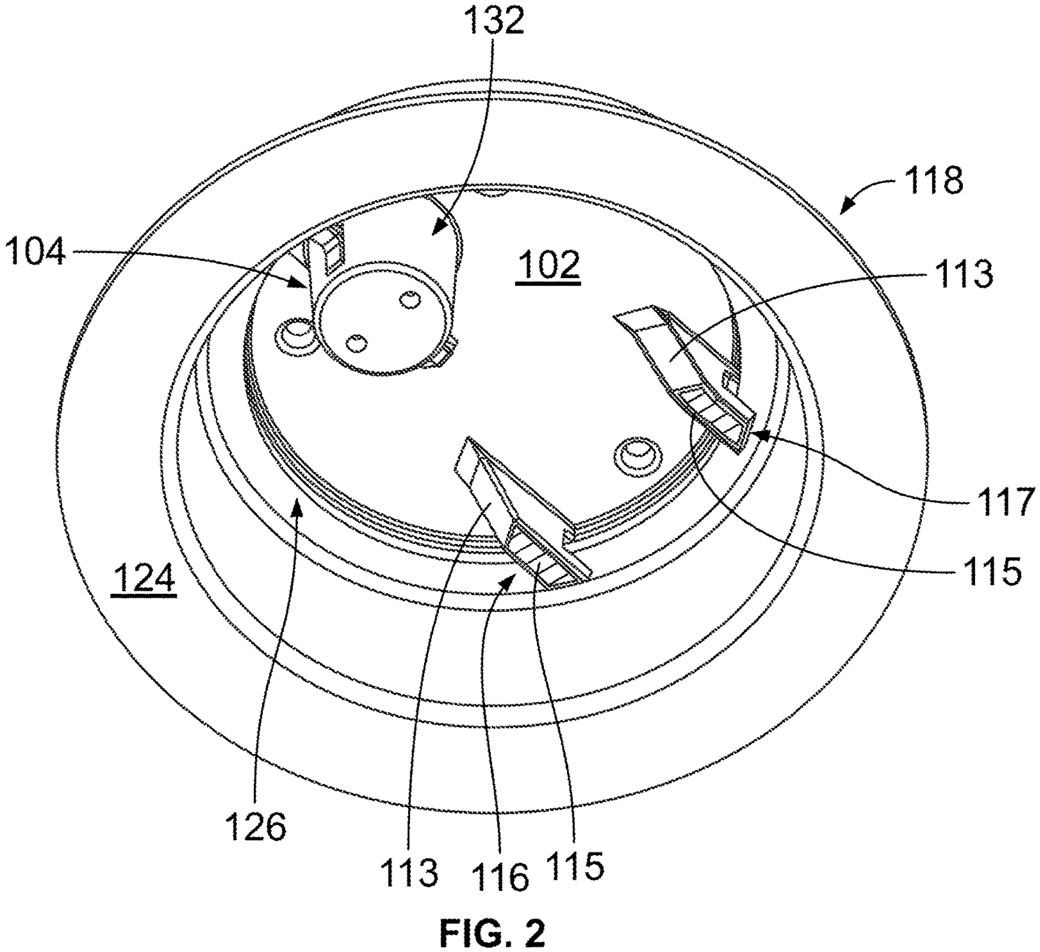
FIG. 2 is a bottom perspective view of the manhole cover assembly of FIG. 1.

FIG. 1 is a side cross-sectional view of a manhole cover assembly 100, according to an example embodiment. It should be noted that for clarity and brevity, embodiments are described herein as relating to manhole cover assemblies. However, embodiments described herein may also be utilized in conjunction with hatch covers or other types of covers. As shown in FIGS. 1 and 2, the manhole cover assembly 100 includes a manhole cover 102, a latch assembly 104, a first lug 116, and a second lug 117. The manhole cover 102 is generally disc-shaped, having a top surface 108, a bottom surface 110, and an outer periphery 112. The latch assembly 104, the first lug 116, and the second lug 117 are each securely coupled (e.g., bolted, welded, integrally cast, etc.) to the bottom surface 110 of the manhole cover 102. The latch assembly 104 includes a latch 114 extending radially outward from the latch assembly 104. Similarly, the first lug 116 and the second lug 117 extend radially outward from the bottom surface 108 of the manhole cover 102.

A frame 118 is configured to support the manhole cover 102 over the opening of a manhole (not shown). The frame 118 is fixedly secured (e.g., cemented or otherwise fixed) within a substrate (e.g., street, road, sidewalk, etc.) defining the opening of the manhole (not shown). The frame 118 is generally ring-shaped, having a peripheral wall 120 extending between an upper surface 122 and an opposite lower surface 124. The peripheral wall 120 has an inner diameter that is slightly larger than an outer diameter of the manhole cover 102. In operation, the upper surface 122 of the frame 118 is generally flush with the road or other surface that defines the manhole.

The frame 118 also includes a projection 126 that extends radially inward from the peripheral wall 120. The projection 126 defines a seat 127 facing longitudinally outward toward the upper surface 122, and defines a catch 129 facing longitudinally inward toward the lower surface 124. The seat 127 is structured to support the manhole cover 102 within the frame 118. More specifically, the bottom surface 110 of the manhole cover 102 proximate the outer periphery 112 rests on, and is supported by, the seat 127 when the manhole cover is in a seated position. The top surface 108 of the manhole cover 102 is generally flush with the upper surface 122 of the frame 118 when the manhole cover 102 is in the seated position. The catch 129 is structured to be engaged by the each of the latch 114, the first lug 116, and the second lug 117 to prevent removal of the manhole cover 102 from the frame 118 without unlocking and operating the latch assembly 104.

FIG. 2 is a bottom perspective view of the manhole cover assembly 100 of FIG. 1, with the manhole cover 102 in the seated position. As shown in FIG. 2, when the manhole cover 102 is in the seated position, there is a gap 130 between the lower surface 124 of the frame 118 and each of the latch 114, the first lug 116, and the second lug 117. The gap 130 is formed to provide a loose fit between the manhole cover 102 and the frame 118 such that the latch assembly 104 is operable (e.g., movable) and not pinched against the catch 129. The gap 130 also provides clearance for manufacturing tolerances in the projection 126. For example, the manhole cover 102 may be placed in the frame 118 in any rotational orientation. The gap 130 provides clearance such that the latch assembly 104 is operable in any rotational orientation of the manhole cover 102, regardless of the variation of thickness of the projection 126. In some embodiments, the manhole cover 102 is rotatable relative to the frame 118 after the manhole cover 102 is resting on the seat 127. The gap 130 allows for clearance between the latch assembly 104 and the catch 129 such that the manhole cover 102 may be rotated 360 rotational degrees. The gap 130 is sized to prevent access to the latch assembly 104 by unauthorized users, such as by prying at the manhole cover 102. In some embodiments, the gap 130 is less than the thickness of the manhole cover 102.

In some embodiments, a sudden pressure increase against the bottom surface 110 of the manhole cover 102 can cause the manhole cover 102 to move relative to the frame 118 from the seated position (e.g., as shown in FIG. 2) to an unseated position. In the unseated position, the latch assembly 104, the first lug 116, and the second lug 117 each contact the catch 129 of the frame 118, thus closing the gap 130. Accordingly, the latch assembly 104, the first lug 116, and the second lug 117 may be configured to limit displacement of the manhole cover 102 during a pressure-inducing event in which the manhole cover 102 is forced to the unseated position. In some embodiments, the gap 130 is greater than a thickness of the manhole cover 102 to allow pressure from gases and liquid to dissipate out of the frame 118.

When in the unseated position, high-pressure fluid (e.g., air or water) and debris may escape from the manhole through a space between the manhole cover 102 and the frame 118, proximate the outer periphery 112 of the manhole cover 102 and the projection 126 of the frame 118. Thus, in response to a pressure-inducing event, the latch assembly 104, the first lug 116, and the second lug 117 of the manhole cover assembly 100 operate to controllably release pressure from within a manhole rather than allowing the pressure to build up beneath the manhole cover 102 to a potentially dangerous level. In doing so, the latch assembly 104, the first lug 116, and the second lug 117 prevent the manhole cover 102 from being launched from the frame 118 by a pressure-inducing event, while also preventing damage to the frame 118 and the surface (e.g., street) to which the frame 118 is secured.

The manhole cover assembly 100 also includes extractor rails 113 fixedly coupled (e.g., welded, integrally cast) to each of the manhole cover 102, the first lug 116, and the second lug 117 so as to form a gradual ramp from the first lug 116 and the second lug 117 to the bottom surface 110 of the manhole cover 102. The extractor rails 113 facilitate easy removal of the manhole cover 102 from the frame 118. In particular, as the manhole cover 102 is pulled away from the frame 118, extractor rails 113 slide against the upper surface 122 of the peripheral wall 120 of the frame 118. Upon the manhole cover 102 being completely removed from the frame 118, a skid pad 115 affixed (e.g., bolted) to a bottom surface 111 of each of the first lug 116 and the second lug 117 contacts the outer surface (e.g., roadway). The skid pad 115 may be formed of high molecular weight polyethylene (HMWP), Teflon, rubber, or other materials.

The latch assembly 104 includes a latch housing 132. The latch housing 132 is structured to support and retain the various components of the latch assembly 104. As illustrated in FIGS. 1 and 2, the latch housing 132 is fixedly coupled (e.g., welded, integrally cast, etc.) to the bottom surface 110 of the manhole cover 102.

The latch assembly 104 further includes a latch bar 134 and a padlock 136. The latch bar 134 is disposed within and is slidably coupled to the latch housing 132. The latch bar 134 defines the latch 114. The padlock 136 is disposed at least partially within the latch housing 132 and is operatively coupled to the latch housing 132 via the padlock 136. The padlock 136 includes a shackle 138 and a lock body 139 that may be operated by a user to unlock and operate the latch bar 134 between a locked position and an unlocked position. The shackle 138 is operably coupled to the lock body 139 such that the shackle 138 may be selectively locked to and extended from the lock body 139, as is common for padlocks.

Figure 3:
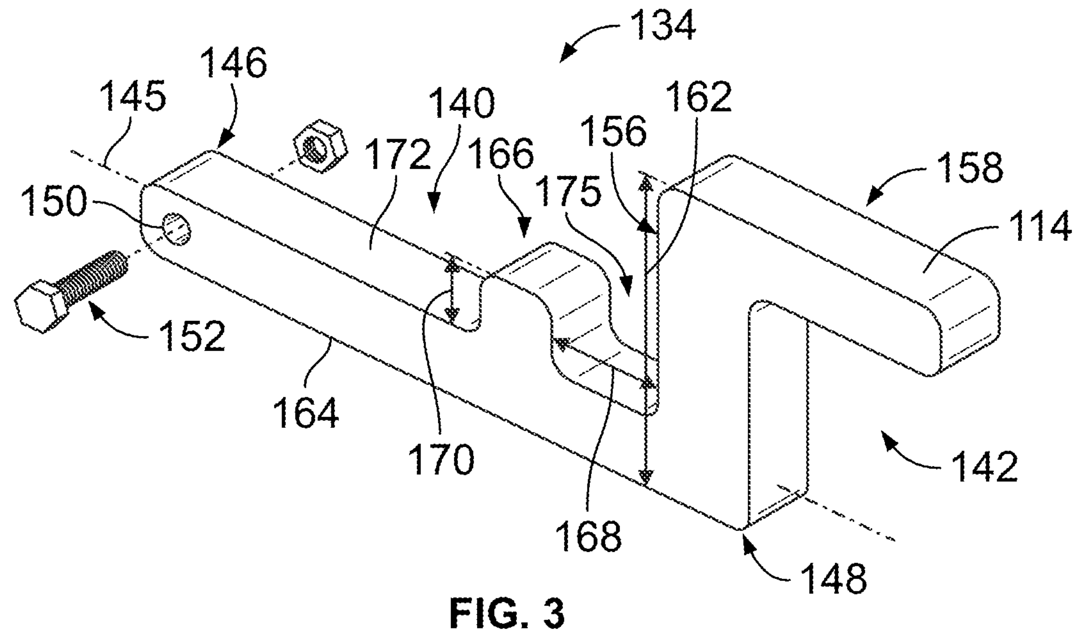
FIG. 3 is a perspective view of a latch bar of the latch assembly of FIG. 1.

Referring now to FIG. 3, a perspective view of the latch bar 134 is shown. The latch bar 134 includes a latch rod 140 and a latch member 142. The latch rod 140 extends along an axis 145. While the latch rod 140 is shown as having a rectangular cross-section, it should be understood that the latch rod 140 may define other cross-sectional shapes, such as round, triangular, hexagonal, octagonal, and the like. In some embodiments, the latch rod 140 is shaped to prevent rotation of the latch rod 140 about the axis 145.

The latch rod 140 defines a first rod end 146 and a second rod end 148 positioned opposite to the first rod end 146. Extending through the first rod end 146 is an opening 150 configured to receive a stop 152, such as the fastener shown. When the stop 152 is coupled to the first rod end 146, the stop 152 is configured to engage an outer surface of the latch housing 132 to prevent movement of the latch bar 134 along the axis 145.

Extending orthogonally away from the second rod end 148 is the latch member 142. The latch member 142 includes a first member portion 156 and a second member portion 158. The first member portion 156 is coupled to the second rod end 148 and extends orthogonally away from the latch rod 140. In other words, the first member portion 156 extends radially away from the latch rod 140 relative to the axis 145. Coupled to and extending orthogonally away from the first member portion 156 is the second member portion 158. The second member portion 158 extends in a direction substantially parallel to the axis 145 and defines a surface, shown as the latch 114. The latch 114 is configured to engage the catch 129 of the manhole frame 107 to prevent removal of the manhole cover 102 when the latch bar 134 is in the locked position.

The latch member 142 defines a member height 162, the member height 162 being a distance from the latch 114 to a bottom surface of the latch rod 140, shown as a bottom rod surface 164.

A lock boss 166 extends from the latch rod 140, separated from the latch member 142 by a boss distance 168. The lock boss 166 extends from the latch rod 140 in the same direction as the latch member 142. The lock boss 166 defines a boss height 170, defined as a distance between the top of the lock boss 166 and a top surface of the latch rod 140, shown as a top rod surface 172.

The lock boss 166, the latch rod 140, and the latch member 142 cooperate to define a U-shaped recess, shown as a lock cavity 175. The lock cavity 175 is configured to receive the lock body 139 of the padlock 136. When the latch bar 134 is in the locked position, the lock body 139 is positioned within the lock cavity 175 and the shackle 138 wraps around the latch rod 140. The lock boss 166 is positioned such that the lock cavity 175 receives the lock body 139 and forms a snug fit such that the padlock 136 is prevented from movement along the axis 145. When the padlock 136 is unlocked, the shackle 138 extends from the lock body such that the lock body 139 may pass over the lock boss 166.

Figure 4:
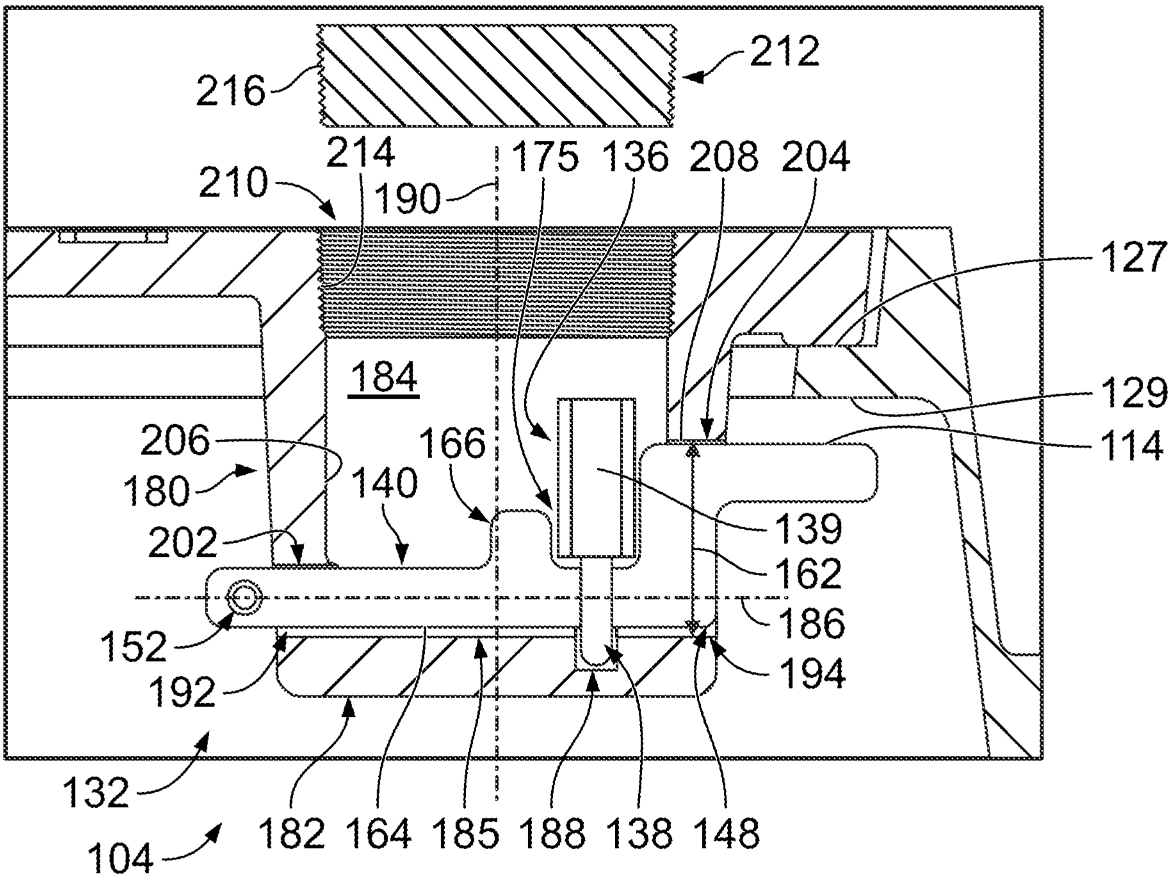
FIG. 4 is a detailed cross-sectional view of the latch assembly of FIG. 1.

Turning now to FIG. 4, a detailed, cross-sectional view of the latch assembly 104 is shown according to an example embodiment. The latch housing 132 includes an annular sidewall 180 and a bottom wall 182 that cooperate to define a housing cavity 184. The annular sidewall 180 defines a substantially circular cross-section when viewed from above. While the latch housing 132 is shown as being round, it should be understood that the latch housing 132 may take other forms, such as square or rectangular. In some embodiments, the annular sidewall 180 and the bottom wall 182 are formed of metal (e.g., steel, iron, aluminum, any alloys thereof, etc.) plates or sheet metal, which are welded together to form the latch housing 132. In some embodiments, the annular sidewall 180 and the bottom wall 182 are formed of cast metal (e.g., steel, iron, aluminum, any alloys thereof, etc.), stamped sheet metal (e.g., steel or aluminum), and injection molded polymer to form the latch housing 132.

The bottom wall 182 defines a channel 185 that extends along a channel axis 186. The channel 185 extends radially relative to the manhole cover 102. The channel 185 is recessed into the bottom wall 182 and is configured to receive the latch rod 140 of the latch bar 134. The latch rod 140 is positioned within the channel 185 such that the axis 145 of the latch rod 140 is parallel to, and in some embodiments co-linear with, the channel axis 186. The latch rod 140 is configured to translate (e.g., slide) within and relative to the channel 185 along the channel axis 186 such that the latch bar 134 is operable between a locked position and an unlocked position.

Extending into the bottom wall 182 is a shackle recess 188. The shackle recess 188 extends perpendicularly to the channel axis 186 and the rod axis 145, and the shackle recess 188 is recessed into both the bottom wall 182 and the channel 185. In some embodiments, the shackle recess 188 defines a U-shaped cavity that extends circumferentially relative to the manhole cover 102. The shackle recess 188 is radially offset from a central axis 190 of the latch housing 132. When the latch bar 134 is in the locked position, the lock cavity 175 is positioned above the shackle recess 188. In the locked position, the padlock 136 is positioned such that the lock body 139 is positioned within the lock cavity 175 and the shackle 138 extends around the latch rod 140 and within the shackle recess 188. In some embodiments, the padlock 136 is positioned entirely within the latch housing 132 (e.g., the housing cavity 184) such that a keyhole of the padlock 136 faces away from the bottom wall 182 and toward the manhole cover 102 when the padlock 136 is both locked and unlocked (e.g., when the latch bar 134 is in both the locked position and the unlocked position). The shackle 138 positioned within the shackle recess 188 prevents translational movement of the latch bar 134 along the channel axis 186.

The channel 185 extends through the latch housing 132 and through the annular sidewall 180, defining a first channel end 192 and a second channel end 194. Positioned at the first channel end 192 is an opening that extends through the annular sidewall 180, shown as a first housing opening 202. The first rod end 146 extends out of the latch housing 132 (e.g., out of the housing cavity 184) through the first housing opening 202. The surfaces that define the first housing opening 202 are structured to form a slip fit with the latch rod 140. In some embodiments, the latch rod 140 and the first housing opening 202 have the same cross-sectional shape. T[the first housing opening 202 may be sized slightly larger to allow for a slip fit between the first housing opening 202 and the latch rod 140. In some embodiments, the first housing opening 202 is structured to prevent rotation of the latch rod 140 about the rod axis 145. For example, the surfaces that define the first housing opening 202 may be hexagonal and configured to prevent rotation of the hexagonal latch rod 140 about the rod axis 145. The first housing opening 202 further prevents movement of the latch rod 140 upward and out of the channel 185 such that the shackle 138 may not be removed from the shackle recess 188.

Positioned at the second channel end 194 and extending through the annular sidewall 180 is a second housing opening 204. At least a portion of the latch member 142 extends out of the latch housing 132 (e.g., extends out of the housing cavity 184) through the second housing opening 204. In some embodiments, the second rod end 148 and the latch member 142 extend out of the latch housing 132 via the second housing opening 204. The second housing opening 204 is similar to the first housing opening 202 in that both the second housing opening 204 and the first housing opening 202 are configured to provide a slip fit for the latch bar 134. The second housing opening 204 defines a height that is approximately equal to the member height 162. Each of the latch 114, the channel 185, and the surfaces that define the second housing opening 204 may be substantially parallel to the rod axis 145 such that the latch bar 134 is prevented from movement out of the channel 185.

As shown in FIG. 4, the latch bar 134 is in the locked positon and the lock cavity 175 is positioned above the shackle recess 188. In some embodiments, the latch bar 134 is positioned over the shackle recess 188 and maintained the shackle 138 of the padlock 136 within the shackle recess 188 when the latch bar 134 is in both the locked position and the unlocked position. For example, to remove the padlock 136 from the latch housing 132, it may first be required to remove the stop 152 and then remove the latch bar 134. The padlock 136 is operably coupled to the latch bar 134 such that the shackle 138 is positioned with shackle recess 188 and the lock body 139 is positioned within the lock cavity 175. Attempts to translate the latch bar 134 along the channel axis 186 are prevented by engagement between the shackle 138 and the surfaces that define the shackle recess 188. Further, movement of the latch bar 134 out of the channel 185, such as by prying, are prevented by the surfaces that define the first housing opening 202 and the second housing opening 204.

To unlock the latch assembly 104, a key is operated to unlock the padlock 136, allowing the lock body 139 to extend upwards and away from the shackle 138, as is common for padlocks. The lock boss 166 is sized such that the lock body 139 may extend up and over the lock boss 166 and be rotated over the lock boss 166. The lock body 139 rotates out of the way of the latch member 142 while the latch bar 134 is slid toward the first channel end 192 and the latch 114 slides radially inward toward a center of the manhole cover 102 (e.g., out of the way of the catch 129). When the padlock 136 is locked, the shackle 138 is positioned within the shackle recess 188, and the latch bar 134 is in the locked position, the engagement between the padlock 136, the shackle recess 188, and the latch bar 134 (e.g., the lock boss 166 and the latch member 142) prevents removal of the latch bar 134 from the latch housing 132, and prevents removal of the manhole cover 102 from the frame 118.

In some embodiments, the latch bar 134 is configured such that the padlock 136 is not removable from the latch housing 132 without disassembling the latch assembly 104. Specifically, the latch bar 134 is configured such that the latch bar 134 is only removable by removing the manhole cover 102 from the frame 118, removing the stop 152 from the first rod end 146, and pulling the latch bar 134 along the channel 185 out of the latch housing 132 through the second housing opening 204. In some embodiments, the lock boss 166 is sized and/or poisoned such that when the lock boss 166 interfaces with an inner surface 206 of the annular sidewall 180 in the unlocked positon, the latch 114 still engages the top surface 208 of the second housing opening 204 and the bottom rod surface 164 is positioned over the shackle recess 188. Thus, the shackle 138 is maintained within the shackle recess 188 and cannot be removed since the latch bar 134 is held within the channel 185 by the surfaces that define the first housing opening 202 and the second housing opening 204.

The latch housing 132 further defines a top opening 210 configured to receive a cap 212. The top opening 210 defines a substantially annular opening and includes first threads 214 extending radially inward from the inner surface 206 of the latch housing 132. The first threads 214 are configured to engage second threads 216 of the cap 212. The top opening 210 permits access to the padlock 136 so as to enable a user to operate the padlock 136. The cap 212 may form a sealing engagement (e.g., watertight seal) with the top opening 210 to prevent the ingress of debris and water into the housing cavity 184.

Figure 5:
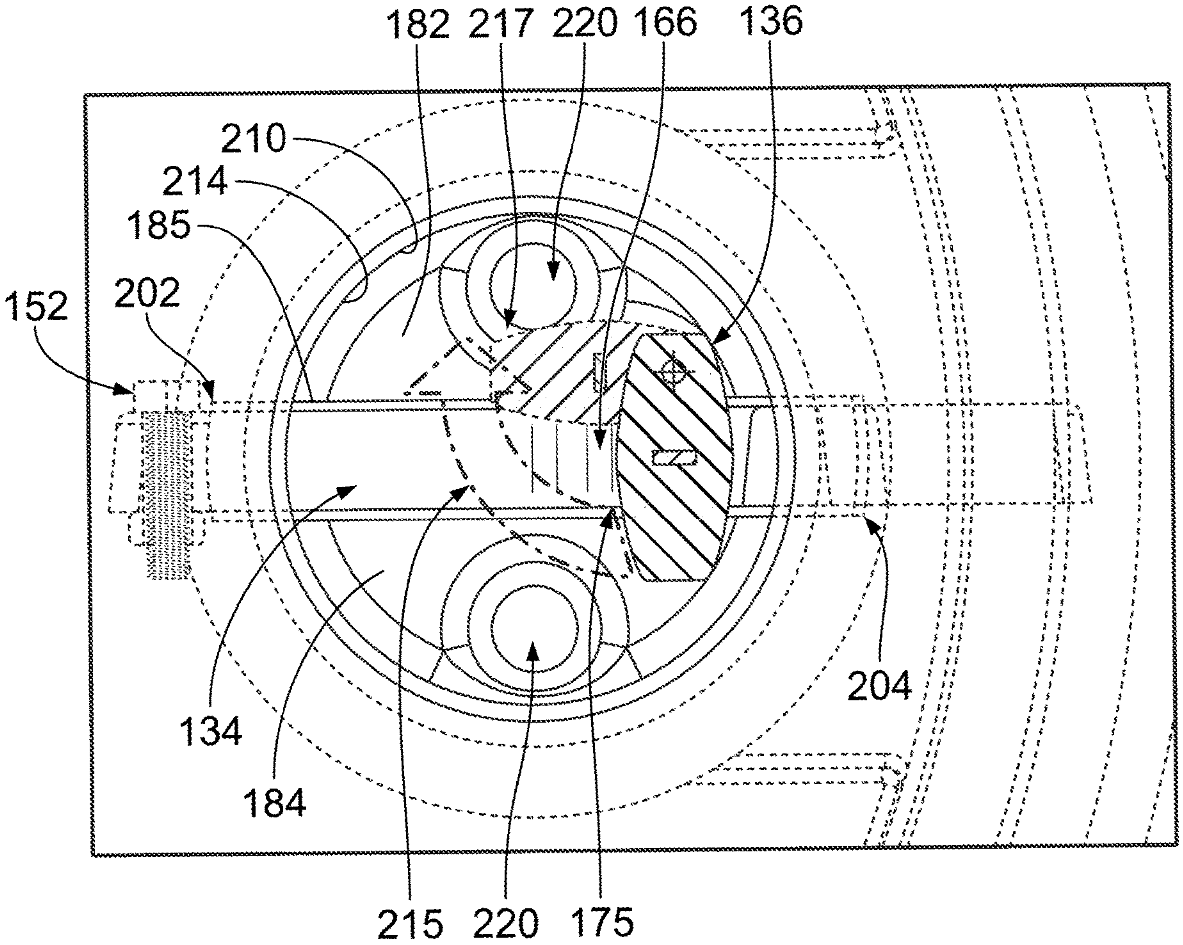
FIG. 5 is a top view of the latch assembly of FIG. 1.

Referring now to FIG. 5, a top view of the latch assembly 104 is shown with the cap 212 removed. The latch assembly 104 is shown in the locked position with the lock body 139 positioned within the lock cavity 175. To transition the latch assembly 104 from the locked position to the unlocked position, a key is used to unlock the padlock 136, lift the lock body 139, and rotate the lock body 139 over the lock boss 166 to the side. As shown by the rotation direction arrow 215 and the shadow padlock 217 (dotted line), the lock body 139 is rotated out of the way of the latch member 142 such that the latch bar 134 may translate along the channel axis 186 toward the stop 152.

The bottom wall 182 of the latch housing 132 includes vents (e.g., openings) 220. According to various embodiments, one or more of the annular sidewall 180 and the bottom wall 182 may define vents 220. The vents 220 permit fluids (e.g., water) and debris to exit the latch housing 132 should fluids and/or debris enter the latch housing 132, e.g., via the top and/or housing openings 210, 202, 204.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "example" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other example embodiments, and that such variations are intended to be encompassed by the present disclosure.

What is claimed is:

1. A manhole cover assembly, comprising:
a manhole frame having a seat;
a manhole cover supportable by the seat of the manhole frame; and
a latch assembly, including:
a latch housing fixedly coupled to the manhole cover, the latch housing having a channel extending through the latch housing and a shackle recess extending into a bottom wall of the latch housing and intersecting the channel;
a latch bar slidably coupled to the channel, the latch bar slidable relative to the latch housing between a locked position and an unlocked position,
a padlock operatively coupled to the latch bar and configured to maintain the latch bar in the locked position, the padlock comprising a shackle received within the shackle recess.

2. A manhole cover assembly, comprising:
a manhole frame having a seat;
a manhole cover supportable by the seat of the manhole frame; and
a latch assembly, including:
a latch housing fixedly coupled to the manhole cover, the latch housing having a channel extending through the latch housing;
a latch bar slidably coupled to the channel, the latch bar slidable relative to the latch housing between a locked position and an unlocked position, the latch bar including:
a latch rod positioned within the channel and slidable along an axis;
a latch member extending away from the latch rod, the latch member having a latch configured to engage a catch of the manhole frame to prevent removal of the manhole cover from the manhole frame; and
a lock boss extending away from the latch rod and positioned away from the latch member; and
a padlock operatively coupled to the latch bar and configured to maintain the latch bar in the locked position, the lock boss cooperating with the latch member and the latch rod to define a lock cavity configured to receive the padlock.

3. The manhole cover assembly of claim 2, wherein:
the latch rod includes a first rod end and a second rod end opposite to the first rod end;
the latch member extends from the second rod end;
the latch is configured to engage the catch of the manhole frame to prevent removal of the manhole cover from the manhole frame when the latch bar is in the locked position; and
the lock boss extends away from the latch rod at a position along the latch rod between the second rod end and the latch member.

4. The manhole cover assembly of claim 1, wherein the padlock is positioned entirely within the latch housing such that a keyhole of the padlock faces toward the manhole cover when the latch bar is in both the locked position and the unlocked position.

5. The manhole cover assembly of claim 1, wherein the channel is recessed within a bottom surface of the latch housing and extends radially relative to the manhole cover.

6. The manhole cover assembly of claim 1, wherein the latch bar further comprises a stop coupled to the latch bar and configured to prevent separation of the latch bar and the latch housing.

7. The manhole cover assembly of claim 1, wherein the latch housing includes an annular sidewall and a bottom wall, the channel extending into the bottom wall along an axis.

8. The manhole cover assembly of claim 7, wherein the channel extends through the annular sidewall such that a first opening and a second opening are defined through the annular sidewall; and
the latch bar is slidable within the channel such that the latch bar is extendable through both the first opening and the second opening.

9. The manhole cover assembly of claim 7, wherein the shackle of the padlock is prevented from being removed from the shackle recess when the latch bar is slidably coupled to the channel.

10. The manhole cover assembly of claim 1, wherein the latch assembly is positioned proximate to a circumference of the manhole cover.

11. The manhole cover assembly of claim 10, wherein the latch bar is extendable radially beyond the circumference of the manhole cover when the latch bar is in the locked position.

12. A manhole cover assembly, comprising:
a manhole cover supportable by a seat of a manhole frame; and
a housing extending from the manhole cover, the housing having sidewalls and a bottom wall;
a channel extending into the bottom wall and extending through the sidewalls such that a first opening and a second opening are defined within the sidewalls;
a shackle recess extending into the channel and the bottom wall, the shackle recess extending through the channel; and
a latch bar positioned within the channel and extending through both the first opening and the second opening, the latch bar comprising:
a latch rod extending through the first opening;
a latch member extending through the second opening; and
a lock boss extending from the latch rod and separated from the latch member such that a lock cavity is defined cooperatively by the lock boss, the latch rod, and the latch member.

13. The manhole cover assembly of claim 12, further comprising a lock having a lock body and a shackle operatively coupled to the lock body, the shackle extending into the shackle recess when the lock body is positioned within the lock cavity.

14. The manhole cover of claim 13, wherein the latch bar, the channel, and the shackle recess are structured such that when the lock is locked, the shackle is positioned within the shackle recess, and the latch bar is in a locked position, the lock, the shackle recess, and the latch bar cooperate to prevent movement of the latch bar along the channel.

15. The manhole cover assembly of claim 12, further comprising a stop coupled to the latch rod and configured to prevent separation of the latch bar and the housing.

16. The manhole cover assembly of claim 12, wherein:

the latch rod includes a first rod end and a second rod end opposite to the first rod end;

the latch member extends from the second rod end and includes a latch configured to engage a catch of the manhole frame to prevent removal of the manhole cover from the manhole frame when the latch bar is in a locked position; and the lock boss extends away from the latch rod at a position along the latch rod between the second rod end and the latch member.

17. A latch assembly for a manhole cover, the latch assembly comprising:

a housing having sidewalls and a bottom wall cooperatively defining a housing cavity;

a first channel extending through the sidewalls such that a first opening and a second opening are defined through the sidewalls; and a latch bar slidable within the first channel between a locked position and an unlocked position, the latch bar slidable through both the first opening and the second opening, the latch bar comprising:

a latch rod having a first rod end and a second rod end opposite to the first rod end, the first rod end extending through the first opening;

a latch member coupled to the second rod end and extending through the second opening; and a lock boss extending from the latch rod between the first rod end and the latch member, the lock boss separated from the latch member such that a lock cavity is defined cooperatively by the lock boss, the latch rod, and the latch member, the lock cavity for receiving a portion of a padlock.

18. The latch assembly of claim 17, further comprising a second channel recessed into the bottom wall and recessed into the first channel, wherein the latch bar is positioned over the second channel when the latch bar is in the locked position and when the latch bar is in the unlocked position.

19. The latch assembly of claim 17, further comprising a stop coupled to the latch bar and configured to prevent separation of the latch bar and the housing.

* * * * *